(12) United States Patent
Wigsten et al.

(10) Patent No.: US 8,066,600 B2
(45) Date of Patent: Nov. 29, 2011

(54) RATCHET MECHANISM FOR A CHAIN DRIVE

(75) Inventors: Mark M. Wigsten, Lansing, NY (US); Timothy Bishop, McLean, NY (US)

(73) Assignee: BorgWarner Inc., Auburn Hills, MI (US)

( * ) Notice: Subject to any disclaimer, the term of this patent is extended or adjusted under 35 U.S.C. 154(b) by 490 days.

(21) Appl. No.: 12/296,545

(22) PCT Filed: Apr. 3, 2007

(86) PCT No.: PCT/US2007/065815
§ 371 (c)(1),
(2), (4) Date: Oct. 16, 2008

(87) PCT Pub. No.: WO2007/124241
PCT Pub. Date: Nov. 1, 2007

(65) Prior Publication Data
US 2009/0275431 A1 Nov. 5, 2009

Related U.S. Application Data

(60) Provisional application No. 60/745,207, filed on Apr. 20, 2006.

(51) Int. Cl.
*F16H 7/08* (2006.01)
(52) U.S. Cl. ........................................ 474/111
(58) Field of Classification Search .................. 474/101, 474/105, 109, 111, 115, 117, 133, 134, 135, 474/140
See application file for complete search history.

(56) References Cited

U.S. PATENT DOCUMENTS

| | | | |
|---|---|---|---|
| 1,848,423 A | 3/1932 | Jackson | |
| 3,245,277 A | 4/1966 | Ward | |
| 4,227,422 A | 10/1980 | Kawashima et al. | |
| 4,261,214 A | 4/1981 | Watanabe et al. | |
| 4,348,199 A | 9/1982 | Oonuma et al. | |
| 6,167,686 B1 | 1/2001 | Becker et al. | |
| 6,371,874 B1 | 4/2002 | Inoue | |
| 6,612,952 B1 * | 9/2003 | Simpson et al. | 474/111 |
| 6,849,015 B2 * | 2/2005 | Markley et al. | 474/111 |
| 6,910,980 B2 | 6/2005 | Hamilton | |

(Continued)

FOREIGN PATENT DOCUMENTS
DE 10203941 8/2002
(Continued)

OTHER PUBLICATIONS

PCT Search Report; PCT/US2007/065815; Jun. 8, 2007, 12 pages.

*Primary Examiner* — Michael Mansen
*Assistant Examiner* — Juan Campos, Jr.
(74) *Attorney, Agent, or Firm* — Brown & Michaels, PC

(57) ABSTRACT

A ratcheting tensioning device for a closed loop chain driven power transmission system of an internal combustion engine consisting of a base tensioner arm (12) and an adjusting tensioner arm (14) which each contact different strands or chain. Optionally, each arm may have a chain guide element for contacting the chain. The two tensioner arms (12, 14) are connected by a link plate (16) that is pivotally mounted to the base tensioner arm (12) in proximity to a first edge (24) of the link plate (16). A channel (52) located in proximity to a second edge (25) of the link plate (16) which allows a pin or sleeved bolt, to be securely attached to the adjusting tensioner arm (14), to traverse along the length of the channel (52) to urge the two tensioner arms (12, 14) toward each other in response to progressively increasing slack in the chain caused by the wearing over time of the components of the power transmission system.

22 Claims, 10 Drawing Sheets

U.S. PATENT DOCUMENTS

| | | | |
|---|---|---|---|
| 7,390,276 B2 * | 6/2008 | Tryphonos | 474/109 |
| 7,429,226 B2 * | 9/2008 | Tryphonos | 474/111 |
| 7,455,606 B2 * | 11/2008 | Markley et al. | 474/109 |
| 7,513,843 B2 * | 4/2009 | Markley et al. | 474/111 |
| 2004/0152548 A1 * | 8/2004 | Markley et al. | 474/140 |
| 2006/0234819 A1 * | 10/2006 | Markley et al. | 474/111 |
| 2006/0281594 A1 * | 12/2006 | Markley et al. | 474/109 |
| 2007/0066428 A1 * | 3/2007 | Tryphonos | 474/111 |
| 2007/0142146 A1 * | 6/2007 | Tryphonos | 474/111 |
| 2010/0075789 A1 * | 3/2010 | Chekansky | 474/110 |

FOREIGN PATENT DOCUMENTS

| | | |
|---|---|---|
| EP | 1072184 | 1/2001 |
| JP | 11092069 | 4/1999 |
| JP | 2002250419 | 9/2002 |
| WO | 2005121599 | 12/2005 |
| WO | 2005121600 | 12/2005 |
| WO | WO 2005121599 A1 * | 12/2005 |
| WO | WO 2005121600 A1 * | 12/2005 |
| WO | 2007050232 | 5/2007 |

* cited by examiner

RATCHET MECHANISM FOR A CHAIN DRIVE

BACKGROUND OF THE INVENTION

1. Field of the Invention

The invention pertains to the field of ratcheted tensioning devices for chain driven power transmission systems on internal combustion engines. More particularly, the invention pertains to a ratchet mechanism designed to compensate for the effects of long term wear on the components of the chain drive system.

2. Description of Related Art

A tensioning device, such as a hydraulic tensioner, is used as a control device for a closed loop power transmission chain as the chain travels between a plurality of sprockets that are connected to various operating shafts of an internal combustion engine. In this system, the chain transmits power from a driving shaft to at least one driven shaft, so that at any point in time, part of the chain is slack and part of the chain is tight. The driven shaft(s) could be either one or more camshaft or a balance shaft. It is important to impart and maintain a certain degree of tension on the chain to prevent noise, slippage, or the unmeshing of teeth as in the case of a toothed chain. Prevention of such slippage is particularly important in the case of a chain driven camshaft in an internal combustion engine because the jumping of teeth will throw off cam timing, possibly causing serious damage to the engine or rendering it totally inoperative.

However, in the harsh environment of an internal combustion engine, numerous factors cause fluctuations in the tension of any given portion of the chain. For instance, extreme temperature fluctuations and differences in thermal expansion coefficient rates between the various parts of the engine can cause the chain tension to vary from excessively high or very low levels. Over time, the components of the chain drive system will wear, which results in a steady decrease in chain tension. In addition, camshaft and crankshaft induced torsional vibrations cause considerable variations in chain tension that are amplified as the various components wear over time. Further, as wear increases, the reverse rotation of the engine, which occurs during stopping or in failed attempts at starting the engine, will result in increasingly severe fluctuations in chain tension. For these reasons, a mechanism is desired to manage the progressive wear of the components of the drive system to insure that the chain and other components of the power transmission system are not subjected to either excessive slack or the over tensioning of the chain.

Hydraulic tensioners are a common method of controlling chain tension. In general, these mechanisms employ a lever arm that pushes against the chain on the slack side of a chain drive system. The lever arm pushes toward the chain, tightening the chain when the chain is slack. However, it also must provide a resistive force as the chain tightens.

To address these concerns, hydraulic tensioners are commonly used. They typically contain a rod or cylinder as a piston, which is biased in the direction of the chain by a tensioner spring. The piston is contained within a cylindrical housing, having an interior space which is open at the end facing the chain and closed at the other end. The interior space of the housing defines a pressure chamber which is connected to a reservoir or exterior source of pressurized hydraulic fluid via channels or ducts. The pressure chamber is typically formed between the housing and the piston, and it expands or contracts as the piston traverses axially within the housing.

Many tensioners also employ a pressure relief mechanism that allows fluid to exit the pressure chamber when the pressure in the chamber is too high, thus allowing the piston to retract at a controlled rate in response to increasing chain tension. In some tensioners, the pressure relief mechanism is a spring biased check valve. The check valve opens when the pressure exceeds a certain pressure point. Some tensioners may employ a valve that performs both the inlet check function as well as the pressure relief function.

Spring blade tensioners are also known to control chain or belt tension where load fluctuations are not too severe so as to overly stress the spring or springs. A ratchet with a backlash mechanism may be added to such tensioners to limit the backward travel of the tensioning device.

A conventional blade tensioner includes a blade shoe having a curved chain sliding face and at least one blade spring. The spring material is preferably a metallic alloy that is treated to impart spring-like tension to the blade spring. Multiple blade springs may be arranged in layers under the chain sliding face to forcefully bias the blade shoe against the chain. The ends of each blade spring are secured within the blade shoe to resist the unlimited retraction of the blade shoe in response to increases in chain tension. A bracket is provided for mounting the blade tensioner to the engine. The bracket may be allowed to pivot with respect to the chain in response to changes in chain tension.

FIG. 1 shows a tensioner that uses a ratchet device in a chain driven power transmission system. The power transmission system includes a drive shaft 302 having a sprocket 303 that uses a continuous loop chain 306 to drive the sprocket 305 of a driven shaft, such as a camshaft, 304. The ratchet tensioner 301 contains a tensioner housing 307 having a hole 312 for receiving a plunger 308 and a ratchet pawl 317 pivotally mounted about pin 316 to the tensioner housing 307 and biased by a ratchet spring 318. The plunger 308 has teeth on one side of its outer perimeter to engage the ratchet pawl 317. The plunger 308 is biased outward from the hole 312 toward the tension lever 310 by the introduction of pressurized fluid into the hollow chamber 313 and by the force of the plunger spring 314. The tensioner lever 310 pivots on support shaft 309 and has a sliding face 311 that contacts and applies tension to the slack side of the timing chain 306. The rearward movement of the plunger 308 back into the hole 312 is limited by the one way engagement of the ratchet pawl 317 with the teeth on the plunger.

One type of tensioner assembly that might be used to compensate for component wear is shown in FIG. 2. A drive sprocket 102 transmits energy from the engine's crank shaft (not shown) via a belt or chain 100 to at least one driven sprocket 104 (104'). A chain drive is most common. The driven sprockets 104 and 104' each drive a camshaft of the internal combustion engine, both of which in turn control engine timing. The strands of chain that run from either the drive sprocket to the at least one driven sprocket or vice versa vary in tension in response to different engine conditions. During engine operation, one strand is substantially tighter than the other strand, which is considered slack by comparison. In systems where the chain engages toothed sprockets, a tensioning device 100 is used to prevent skipping of the chain from the sprocket teeth in response to chain tension fluctuations.

The tensioning device 100 is made up of two tensioner brackets 112 and 112'. Each tensioner bracket is pivotally mounted to the engine at a single pivot point 106, 106', 106a, or 106a', the specific location being dictated by different design parameters for a specific engine. For example, tensioner bracket 112 may be secured at a first end 107 at pivot point 106 or approximately at a mid point 106a along its length, while tensioner bracket 112' might be secured to the engine at its first end 107' at pivot point 106' or approximately at a mid point 106a' along its length. The second ends of the tensioner brackets 112 and 112', designated as 109 and 109', respectively, are adjustably connected to each other by arm 130. Arm 130 contains a ratchet mechanism 155, which, in this instance is a toothed device designed to tighten in response to excessive slack in the chain or the wearing of the components of the power transmission system over time. The teeth of the ratchet 155 index in only one direction, thus providing a no return function. As the components of the chain drive system wear with time, sudden and severe spikes or surges in chain tension may result in the undesired indexing of at least one tooth. Since the ratchet cannot return to its prior position, this could result in the undesired over-tensioning of the chain when normal operating conditions return.

It is an object of the present invention to provide a ratchet mechanism for a chain tensioner that functions with limited travel under low tension conditions. In this way, the tensioner compensates for the wearing of the various components of the chain drive system over time while tensioning the chain in response to the wide range of fluctuations in chain tension under normal operating conditions. The tensioner must be able to function effectively in the various chain drive systems present within an internal combustion engine, such as, for example, a driveshaft/camshaft system or a balance shaft system.

It is another object of the present invention to provide a less expensive and quieter replacement for conventional ratcheted hydraulic tensioners. The present invention satisfies this objective by providing a device that is more compact than a traditional ratcheted hydraulic tensioner, thus taking up less room in the highly space compromised chain drive compartment of most internal combustion engines.

SUMMARY OF THE INVENTION

The present invention is a ratchet tensioner for a closed loop chain driven power transmission system for an internal combustion engine. It consists of a tensioner arm that is in contact with each of two strands of the chain that traverses between a drive sprocket and at least one driven sprocket. Each of the tensioner arms is secured to the engine housing. The tensioner arms may be pivot mounted or one may be in a fixed position while the other pivots. Each tensioner arm may contact the chain via an elongated chain sliding face or, optionally, one or both of the tensioner arms may contain a compliant chain guide element as the primary contact surface with the strand of chain with which it is engaged. The two tensioner arms are connected by a link plate that is pivotally mounted to one of the tensioner arms, referred to as the base tensioner arm, to urge the link plate to pivot in one direction about the pivot mount.

The second end of the link plate is connected to the other tensioner arm, referred to as the adjusting tensioner arm, by a ratcheting means which consists of a channel located in proximity to the second end of the link plate. A pin or sleeved bolt is securely affixed to the adjusting tensioner arm and traverses through the channel. The channel is at an angle of from approximately 5 to approximately 15 degrees from the perpendicular of an imaginary line that extends from the pivot mount to the centerline of the channel. The outer, or distal side of the channel may have a scalloped configuration running along all or part of its length to adjustably engage the pin attached to the adjusting tensioner arm.

In an alternate embodiment, a pin, referred to as a ratcheting pin, is securely mounted to the link plate adjacent to the second end of the link plate and extends in the direction of the adjusting tensioner arm. The outer edge of the adjusting tensioner arm is scalloped to adjustably engage the ratcheting pin in one direction only.

As the various components of the chain driven power transmission system wear over time, the pivot plate pivots about the pivot pin in the base tensioner arm so that the ratcheting pin traverses down the channel in small increments to adjust for the progressively increasing slack caused by the wearing of the components of the system over time.

DETAILED DESCRIPTION OF THE INVENTION

Figure 1:
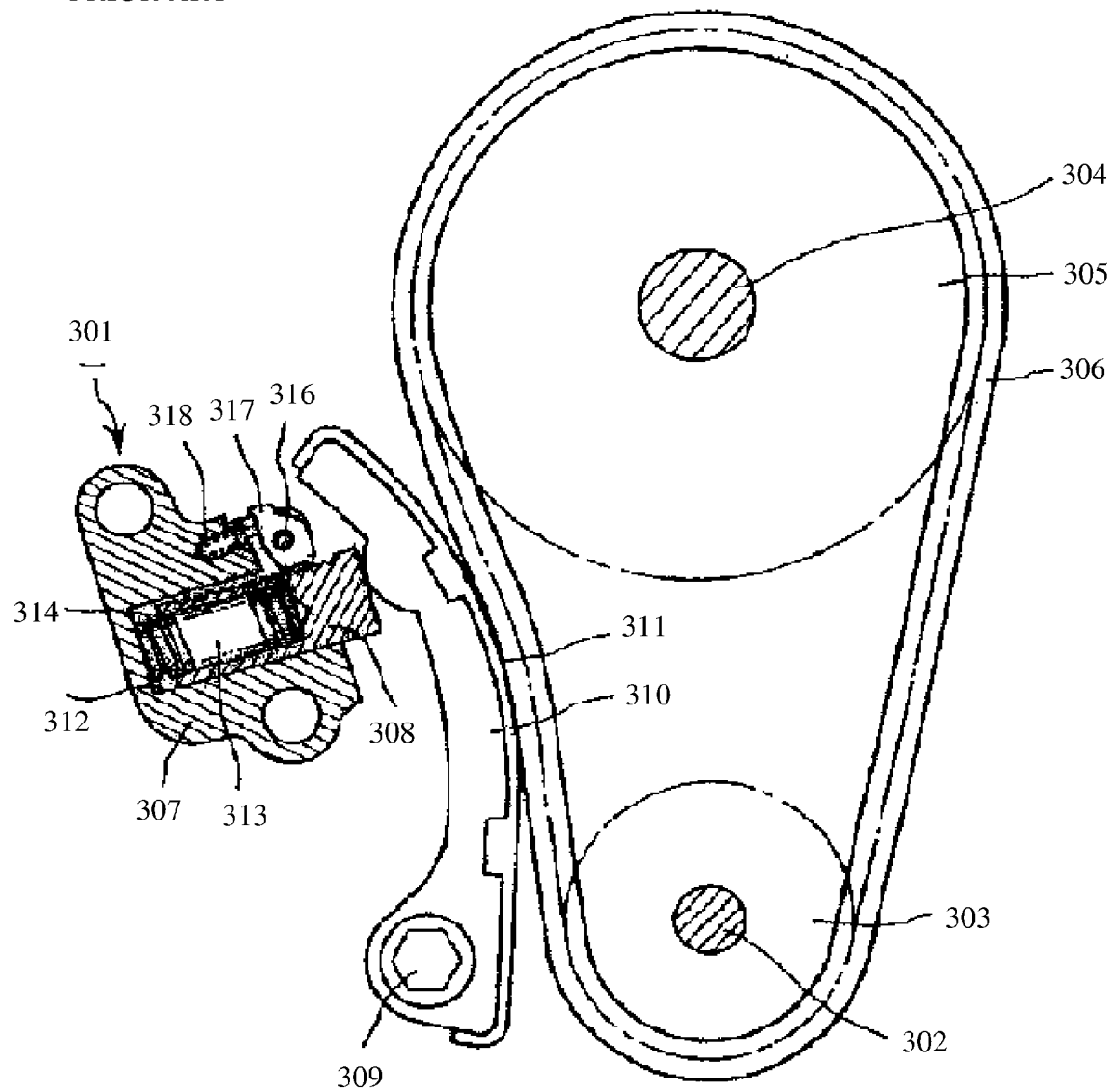
FIG. 1 shows a prior art single strand chain tensioner that uses a hydraulic ratcheting device providing force to a pivoting tensioning arm.
Figure 2:
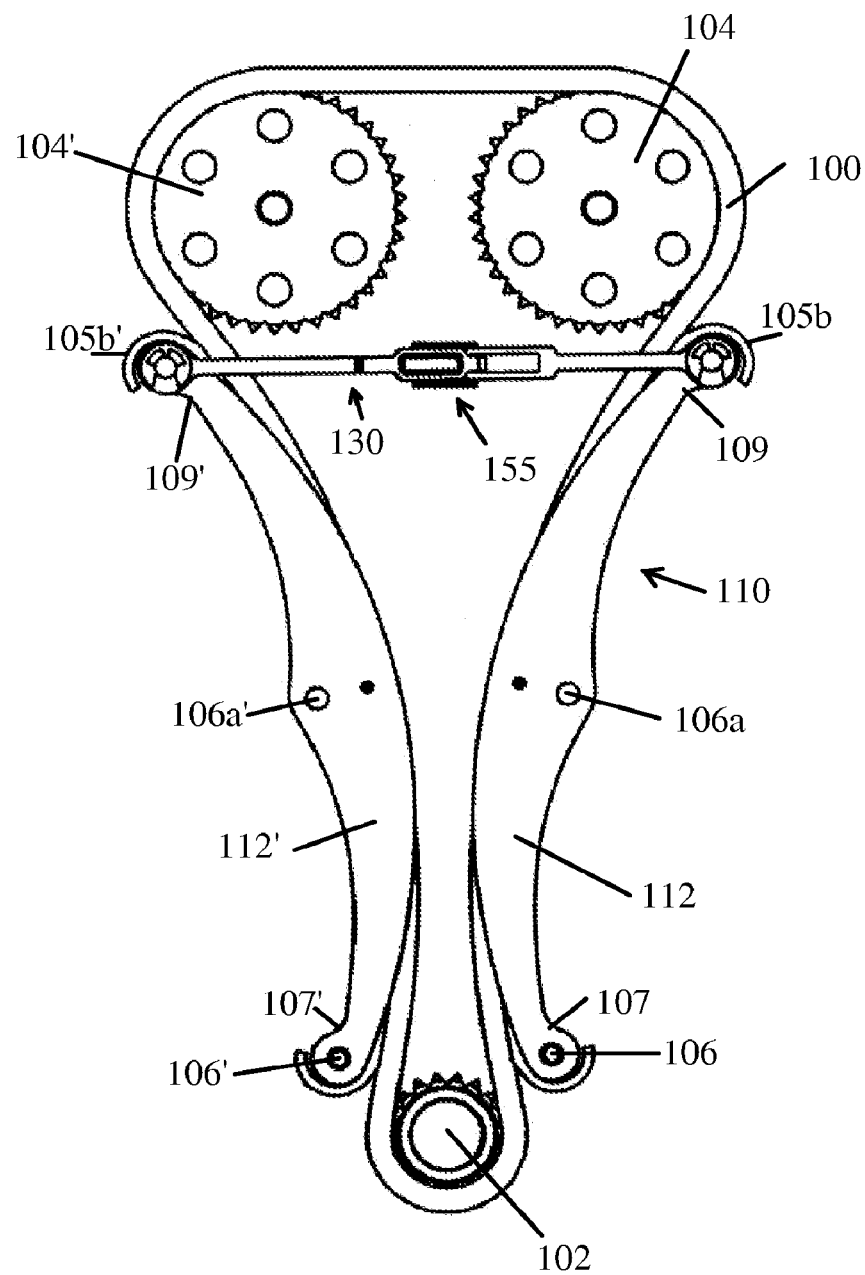
FIG. 2 shows a prior art tensioner having two pivoting tensioning arms connected to each other at their floating ends by an arm having a ratchet device.
Figure 3:
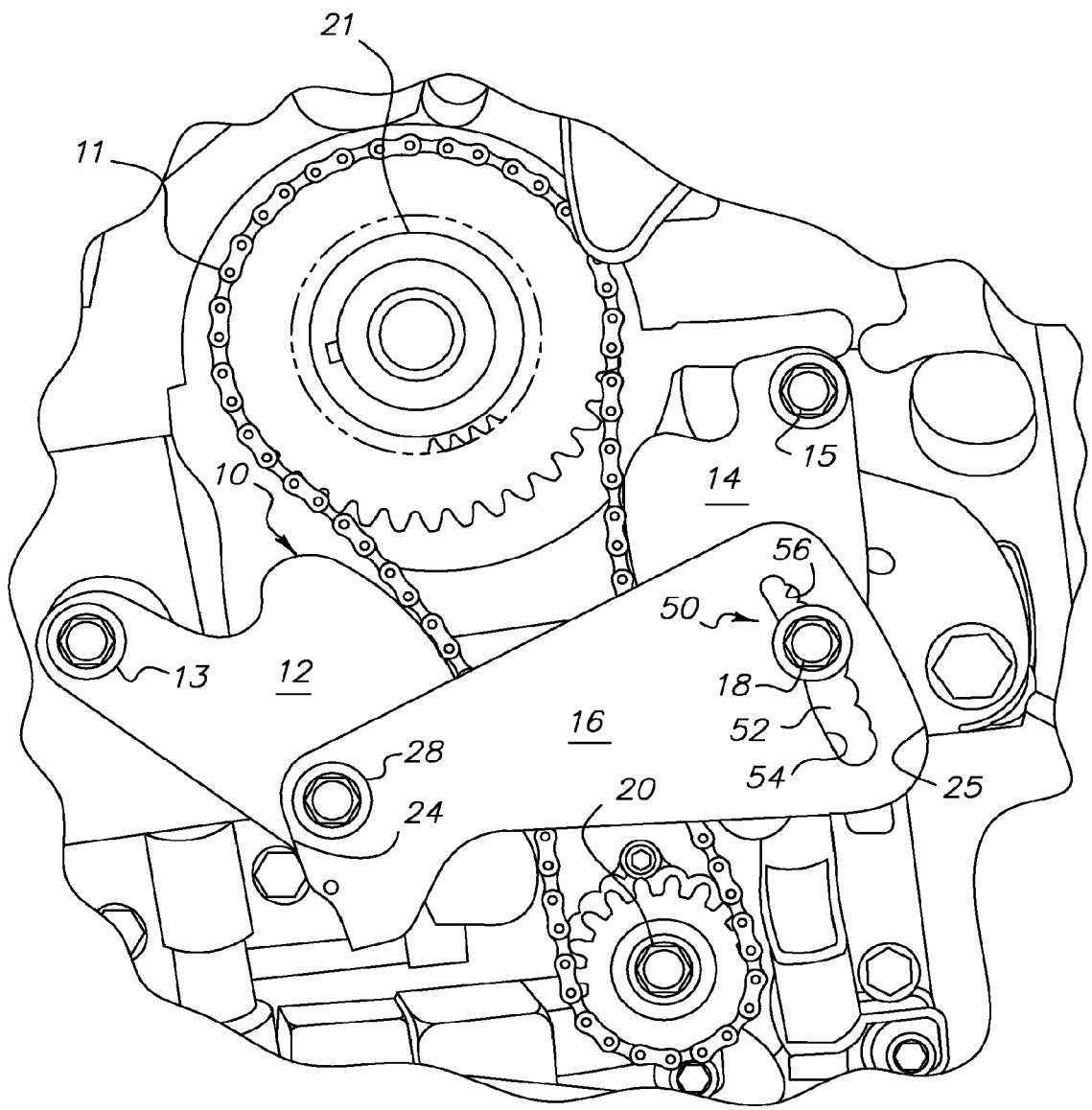
FIG. 3 shows a frontal view of the ratcheting tensioner of the present invention in operation on a closed loop chain driven power transmission system.
Figure 4A:
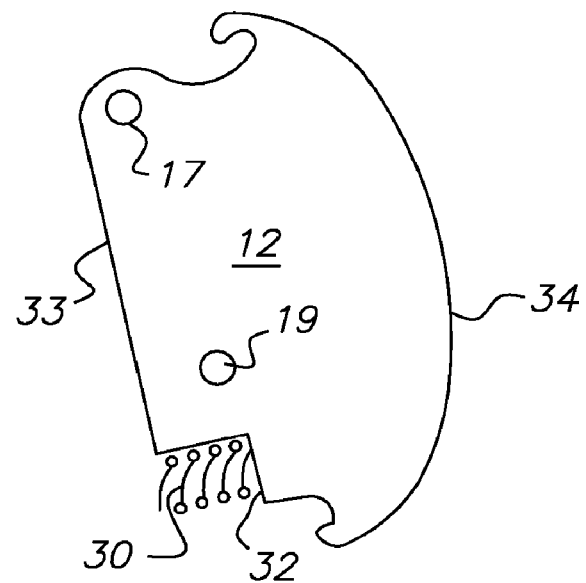
FIG. 4A shows a base tensioner arm having a coil spring to provide torque for the operation of the ratcheting tensioner of the invention.
Figure 4B:
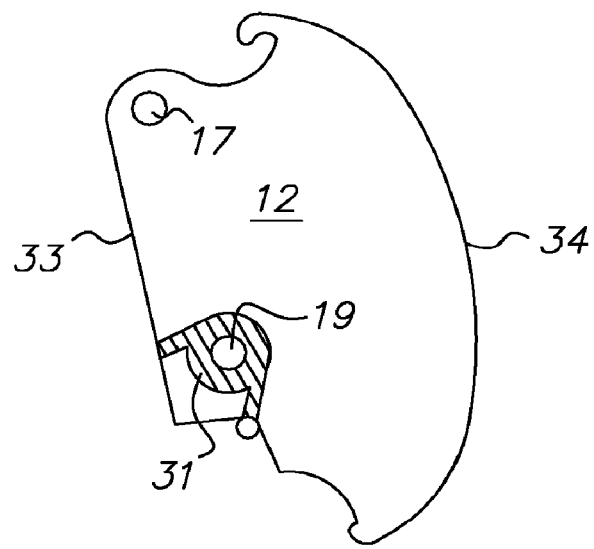
FIG. 4B shows an alternate base tensioner arm having a torsion spring to provide the required torque.
Figure 5A:
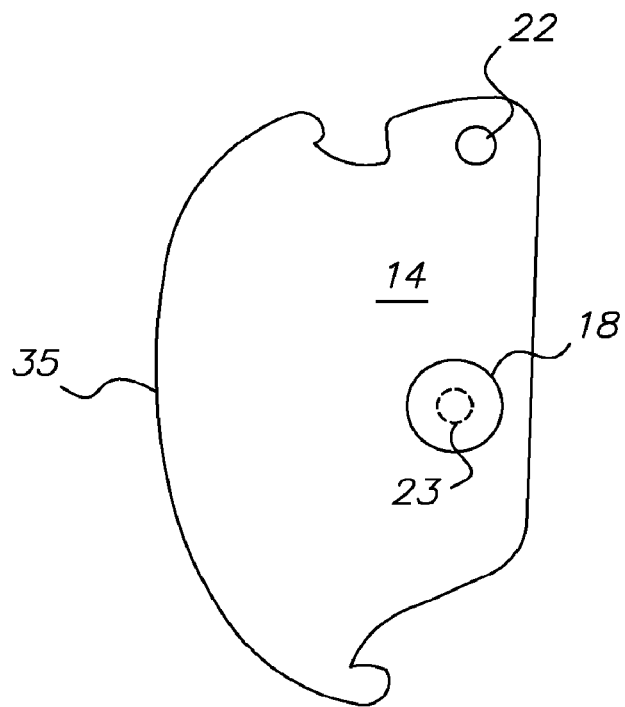
FIG. 5A shows an adjusting tensioner arm of a first and a second embodiment of the invention.
Figure 5B:
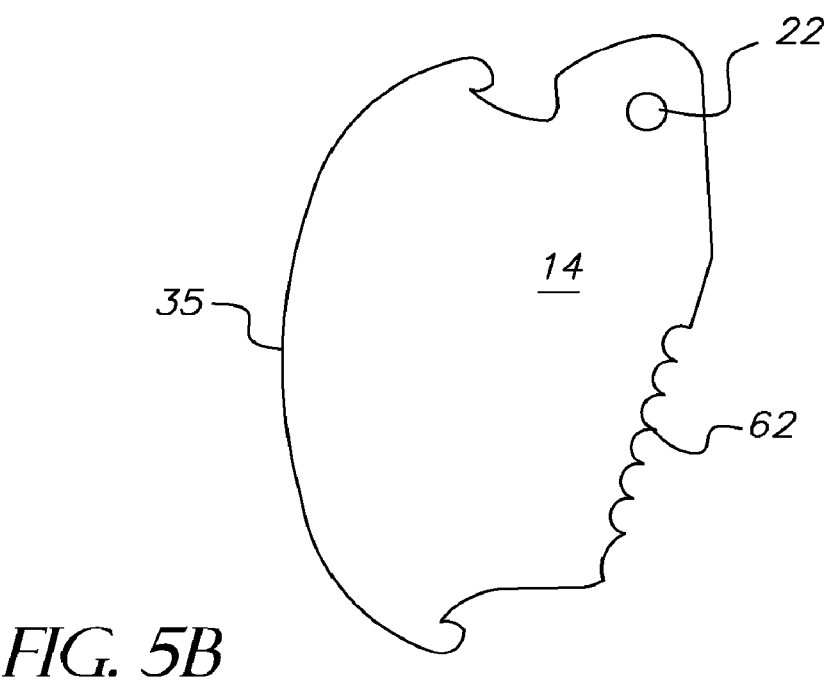
FIG. 5B shows an adjusting tensioner arm of a third embodiment of the invention.
Figure 6A:
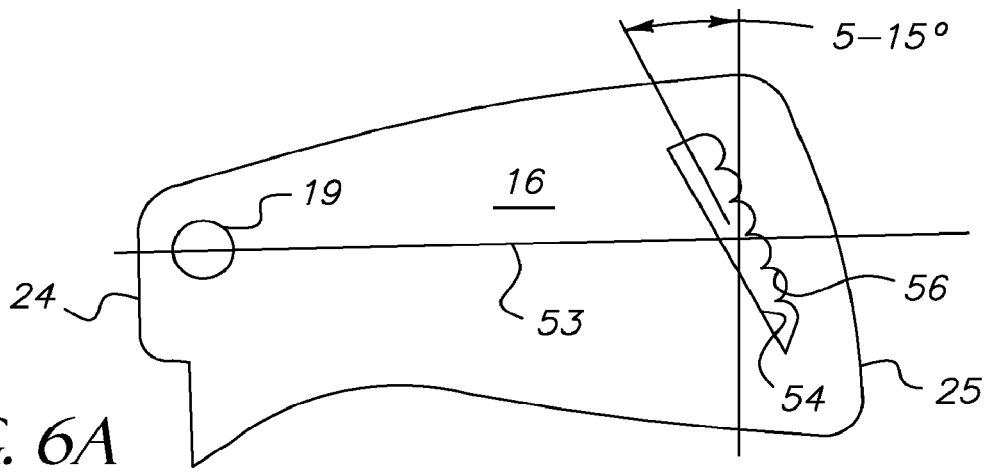
FIG. 6A shows a frontal view of the pivot plate for use with the first embodiment of the invention.
Figure 6B:
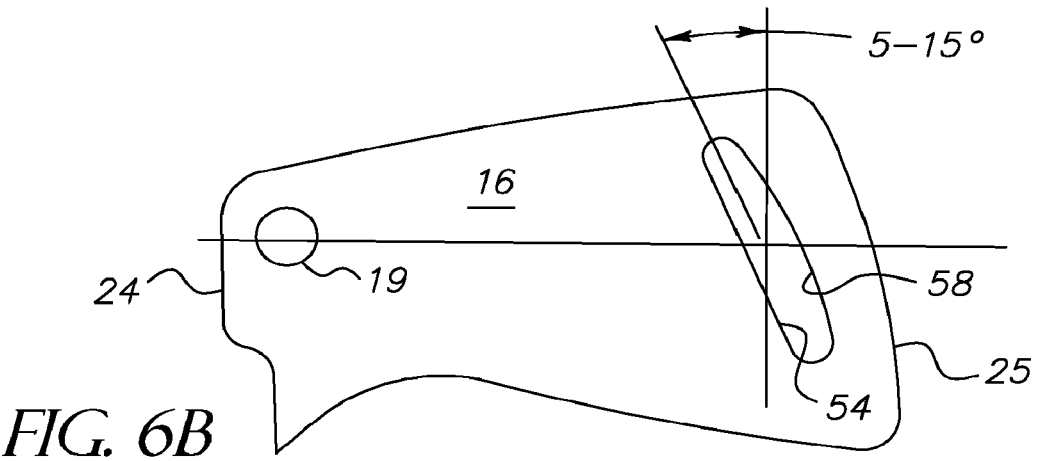
FIG. 6B shows a frontal view of the pivot plate for use with the second embodiment of the invention.
Figure 6C:
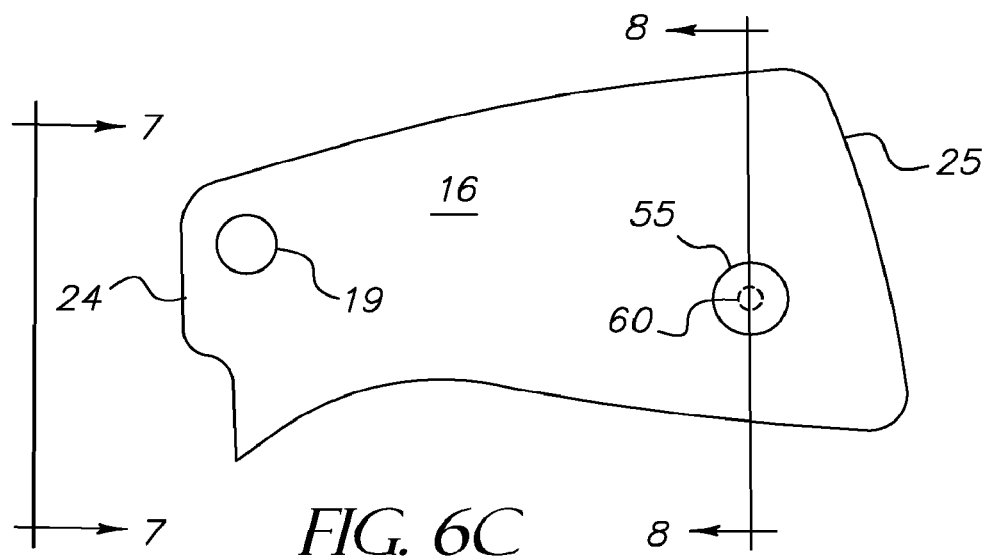
FIG. 6C shows a frontal view of the pivot plate for use with the third embodiment of the invention.
Figure 7:
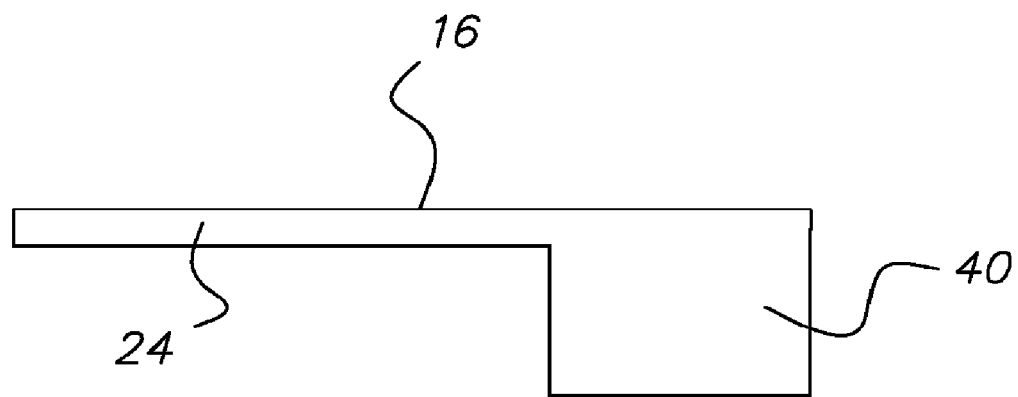
FIG. 7 shows a perspective view of the pivot plate along line 7-7 of FIG. 6C.

Referring to FIG. 3, the present invention consists of a ratcheting tensioner 10 for a closed loop chain driven power transmission system of an internal combustion engine. It contains a base tensioner arm 12 that is in operative engagement along a chain sliding surface 34 (FIGS. 4A and 4B) of the inner edge of the base tensioner arm with one strand of chain 11. Base tensioner arm 12 is secured to the engine housing by a first mounting means 13 through retention hole 17 (FIGS. 4A and 4B). First mounting means 13 may consist of a bolt, rivet or pin that permits the base tensioner arm to pivot about the first mounting means. An adjusting tensioner arm 14 is in operative engagement along a chain sliding surface 35 (FIGS. 5A and 5B) of the inner edge of the adjusting tensioner arm with the other strand of chain 11 and is mounted to the engine housing by a second mounting means 15 through retention hole 22 (FIGS. 5A and 5B). The second mounting means 15 consists of either a bolt, rivet, pin or sleeved bolt to enable the adjusting tensioner arm 14 to be either rigidly or pivotally mounted to the engine housing, as required by specific design parameters. The two tensioner arms are operatively connected by a link plate 16 having a first edge 24 and a second edge 25. The first edge 24 of the pivot plate 16 is mounted to the base tensioner arm 12 by torsional pivot mount 28 through retention hole 19 (FIGS. 6A, 6B and 6C). A torsional force is applied to the torsional pivot mount 28 of the base tensioner arm 12 by a coil spring 30 (FIG. 4A) located between a perpendicularly upset tab 40 (FIG. 7) that is integral with the first edge 24 of the link plate 16 and a retention pocket 32 on the outer edge 33 of the base tensioner arm 12. Optionally, a torsion spring 31 (FIG. 4B) operatively engaged with the torsional pivot mount 28 may also provide the required torque instead of coil spring 30. This torsional force urges the link plate to pivot in one direction about the torsional pivot mount 28.

The second edge 25 of the link plate 16 is connected to the adjusting tensioner arm 14 by a ratcheting means 50 (FIG. 3). A first embodiment of ratcheting means 50 consists of a channel 52 located in proximity to the second edge 25 of the link plate 16 (FIG. 6A). A pin or sleeved bolt, hereinafter referred to as the ratchet pin 18 (FIG. 3), is securely affixed to the adjusting tensioner arm 14 and traverses through the channel 52 during operation of the ratcheting tensioner 10. The channel 52 is at an angle of from approximately 5 to approximately 15 degrees from the perpendicular of an imaginary line 53 that extends from the torsional pivot mount 28 to a point equidistant from both side walls and both ends of channel 52, as shown in both FIGS. 6A and 6B. In the first embodiment of the invention, as partially exhibited in FIG. 6A, the inner, or proximal, side wall 54 of channel 52 is smooth and the outer, or distal, side wall 56 of the channel has a scalloped or similarly shaped configuration running along all or part of its length to adjustably engage ratchet pin 18.

A second embodiment of the invention is shown in FIG. 6B. Both side walls 54 and 58 of the channel 52 are smooth and the ratchet pin 18 incrementally engages the proximal side wall 54 of the channel 52 where the ratchet pin 18 is held in place by frictional forces between the ratchet pin and a smooth distal side wall 58 as the link plate 16 pivots about the torsional pivot mount 28.

Figure 8:
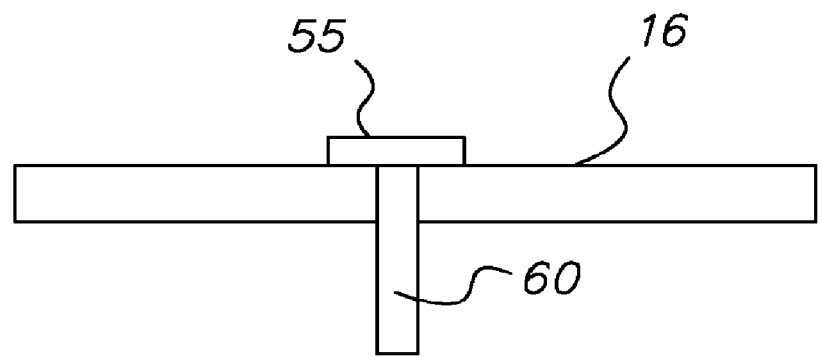
FIG. 8 shows a cross section of the pivot plate along line 8-8 of FIG. 6C.

A third embodiment of the invention is shown in FIG. 6C. A pin 60 is securely mounted to the link plate 16 in proximity to the second end 25 of the link plate and projects in the direction of the adjusting tensioner arm 14. FIG. 8 is a cross-section along line 8-8 of FIG. 6C and shows the pin 60 riveted or secured by a nut or similar retention means 55, to the link plate. Referring to FIG. 5B, the outer edge 62 of the adjusting tensioner arm 14 is scalloped to allow the pin 60 is adjustably index along the length of the outer edge 62 in response to the pivoting motion of link plate 16.

Figure 11:
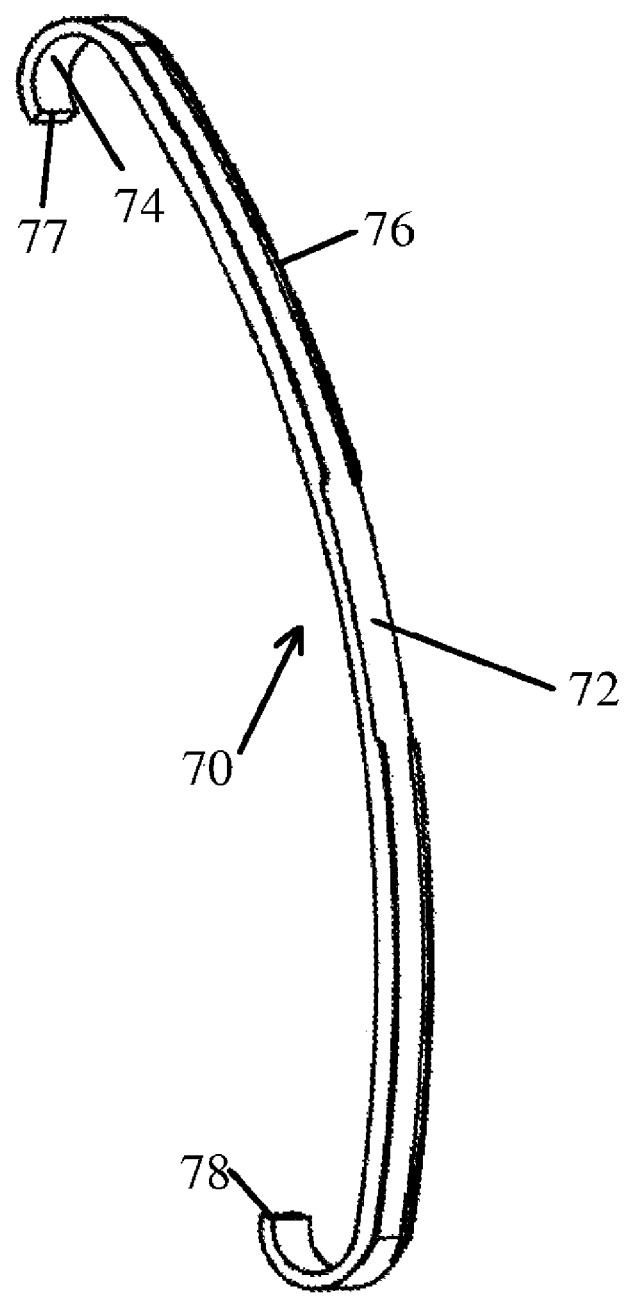
FIG. 11 shows an isometric view of the compliant chain guide element.

Optionally, each tensioner arm, 12 and 14, may include a compliant chain guide element 70 on its inner edge to engage one strand of chain 11 with which each respective tensioner arm is operatively engaged. Referring to FIG. 11, each chain guide element 70 has a chain sliding surface 72 that provides the surface on which the chain 11 slides. Opposite the chain sliding surface 72 of the compliant chain guide element 70 is the inner surface 74. Guide rails 76 are substantially perpendicularly upset from the longitudinal edges of the chain sliding surface 72 keep the chain 11 properly positioned on the chain sliding surface 72. Each compliant chain guide element 70 has a hooked shaped first end 77 and a hooked shaped second end 78 which both curve back toward the middle portion of the compliant chain guide element 70.

Figure 9A:
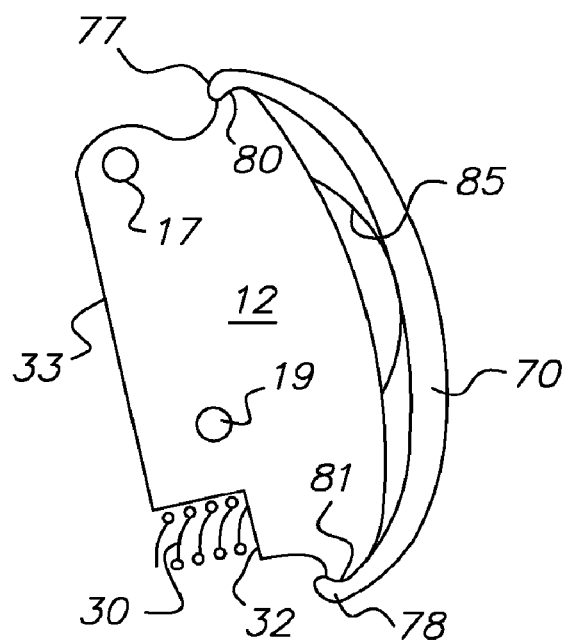
FIG. 9A shows the base tensioner arm having a coil spring with a compliant chain guide element.
Figure 9B:
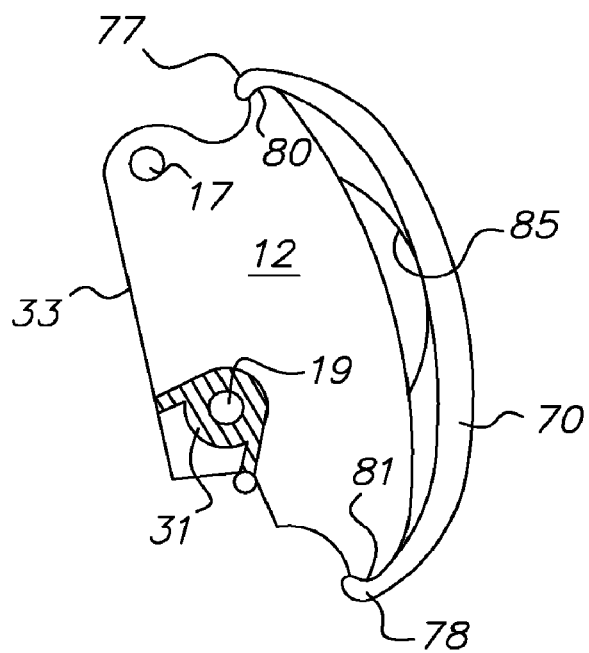
FIG. 9B shows the base tensioner arm having a torsion spring with a compliant chain guide element.
Figure 10A:
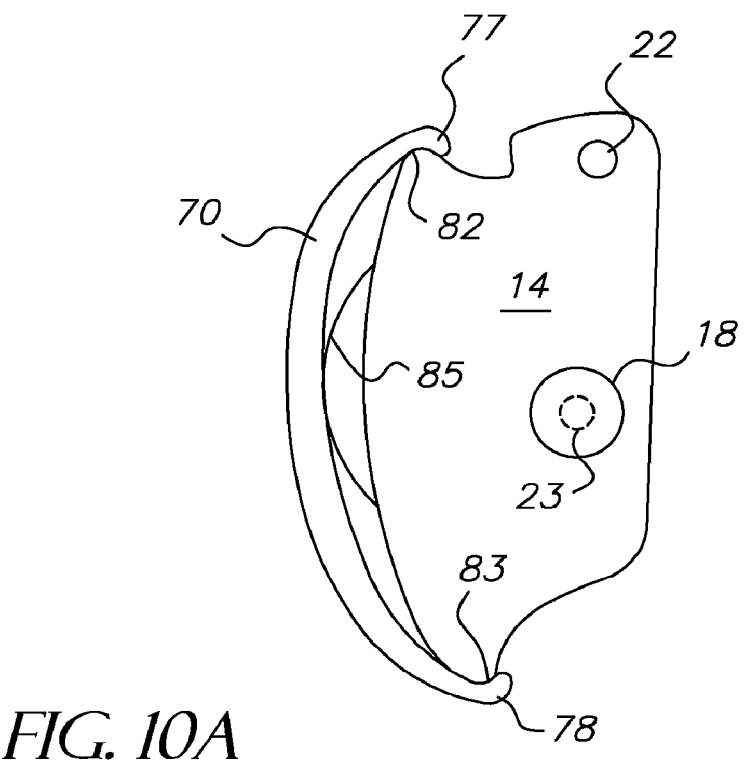
FIG. 10A shows the adjusting tensioner arm of the first and second embodiments with a compliant chain guide element.
Figure 10B:
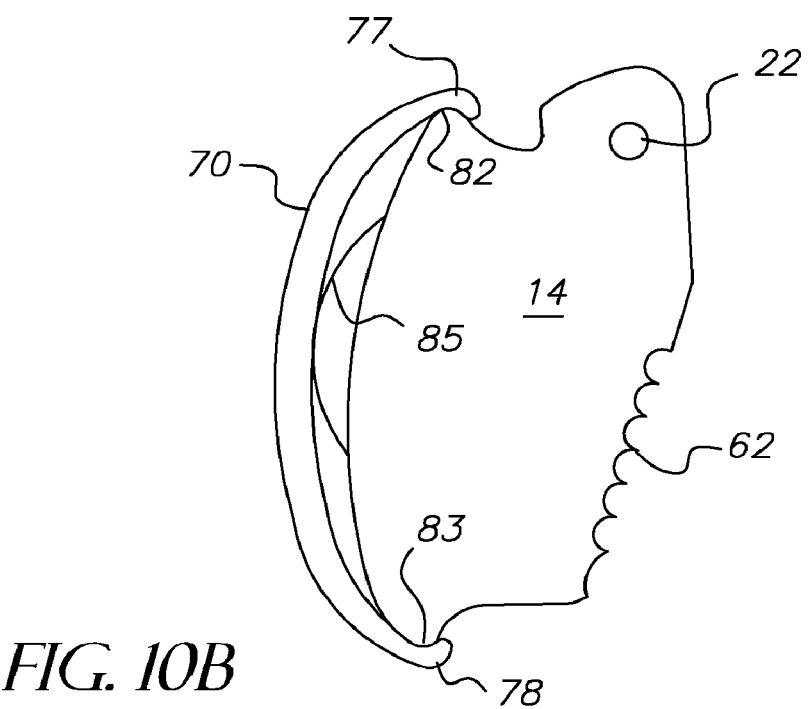
FIG. 10B shows the adjusting tensioner arm of the third embodiment with a compliant chain guide element.

Referring to FIGS. 9A and 9B, the first end 77 of compliant chain guide element 70 is non-permanently hooked around a first protrusion 80 on base tensioner arm 12 and the second end 78 of the compliant chain guide element 70 is non-permanently hooked around a second protrusion 81 on base tensioner arm 12. Similarly, referring to FIGS. 10A and 10B, the first end 77 of the compliant chain guide element 70 is non-permanently hooked around a first protrusion 82 of adjusting tensioner arm 14 and the second end 78 of the compliant chain guide element 70 is non-permanently hooked around a second protrusion 83 of adjusting tensioner arm 14.

The compliant chain guide element 70 is made of a semi-flexible compliant material that provides it with structural memory. It may consist of a treated metal alloy or a nylon, acrylic or resin filled plastic composite. It is manufactured and optionally treated so that, in its free state, the first end 77 and the second end 78 want to curl toward each other. Since the compliant chain guide element 70 is under tension, it exerts a biasing force against the strand of chain with which it is slidably engaged. During normal engine operation, the tension of chain 11 fluctuates between slack and tight conditions. The compliant chain guide element 70 on its respective base tensioner arm 12 and/or adjusting tensioner arm 14 will flex toward the chain 11 with a resistive biasing force in an effort to stabilize these fluctuations in chain tension. The amount of potential travel available from each compliant chain guide element 70 that enables it to respond to the slackening of the chain is determined, in part, by the total combined clearance between the first end 77 of the compliant chain guide element 70 and the respective first protrusion on the base tensioner arm 80 or the adjusting tensioner arm 82 and the second end 78 of the compliant chain guide element 70 and the second protrusion on the second base tensioner arm 81 or the adjusting tensioner arm 83 as the inner surface 74 of the compliant chain guide element 70 fully abuts the inner edge of its respective tensioner arm.

Some designs dictate that more force may be required to counter fluctuations in chain tension. In such cases, at least one blade spring 85 may be inserted between the inner surface 74 of the compliant chain guide element 70 and the inner edge of its respective tensioner arm. Blade spring 85 has an elongated rectangular shape and may be made from spring like materials, such as spring steel, that is manufactured and treated so that, in its free state, its ends want to curl inward toward each other. Blade springs 85 are installed under tension between the inner surfaces 74 of the compliant chain guide elements 70 and the inner edges of the respective tensioner arms in order to augment the biasing forces of the compliant chain guide elements 70. There may be only one blade spring installed between each compliant chain guide element 70 and its respective tensioner arm or more than one. Multiple blade springs 85 may be configured "in series" along the length of the inner surface 74 of the compliant chain guide element 70 or they may be stacked one on another at a single point of contact with the inner surface 74. When required by differences between the designs of each engine or power transmission system, it may be necessary to impart different tensioning to different strands of chain 11. In such instances, the force potential of an individual spring and the number of blade springs utilized in any specific chain drive system may vary. For example, base tensioner arm 12 may utilize one or more blade spring, while adjusting tensioner arm 14 may not employ any blade springs. Alternatively, base tensioner arm 12 may use only one blade spring while adjusting tensioner arm 14 may incorporate multiple blade springs. The numbers, locations and force potentials of blade springs that may be used with the present invention is not intended to be limited by the foregoing examples.

As the various components, such as the chain 11 or the teeth of the drive sprocket 20 and/or the driven sprocket 21, of the chain driven power transmission system wear over time, the torsional force that is maintained on the link plate 16 at the torsional pivot mount 28 allows link plate 16 to pivot relative to the base tensioner arm 12 so that the pin 60 progressively traverses up channel 52 in minimal increments to urge both tensioning arms 12 and 14 closer together in order to compensate for progressively increasing slack in the chain drive system.

When the optional compliant chain guide element 70 is added to either or both of the base tensioner arm 12 and the adjusting tensioner arm 14, normal operational fluctuations in chain tension are addressed by the resistance provided by the force of each compliant chain guide element 70, with or without the supplemental biasing forces of the optional blade springs 85. The total biasing force provided by the compliant chain guide elements 70 and the blade springs 85 must be greater than the torsional force acting on the link plate 16 so that the compliant chain guide element 70 of each of the tensioner arms maintains uninterrupted tensioned contact with its adjacent strand of chain. Because of this force differential, the ratcheting tensioner 10 of the invention only takes up the slack in the power transmission system that is caused by the wearing of the components over time. Since the torsional force applied to the link plate 16 is less than the combined forces of the blade springs 85, if present, and the compliant chain guide elements 70 of both tensioner arms, the ratcheting tensioner 10 of the invention will only index in response to slack caused by the excessive wear of the components of the chain drive system and not in response to normal operational fluctuations in chain tension.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A ratcheting tensioner for a closed loop chain driven power transmission system of an internal combustion engine comprising:
   a) a base tensioner arm pivotally mounted to the engine having an inner edge with a chain sliding surface to operatively engage one strand of the chain and an outer edge,
   b) an adjusting tensioner arm mounted to the engine having an inner edge with a chain sliding surface to operatively engage a second strand of the chain and an outer edge,
   c) a link plate having a first edge and a second edge, the link plate being pivotally secured to the base tensioner arm in proximity to the first edge by a torsional pivot mount;
   d) a ratchet located in proximity to the second edge of the link plate comprising a longitudinally shaped channel having a centerline, a length, an inner side wall and an outer side wall, wherein the centerline of the channel is positioned approximately 5 to 15 degrees from a perpendicular of an imaginary line between an axis of the torsional pivot mount and the centerline of the channel; and
   e) a ratchet pin secured to the adjusting tensioner arm which traverses in only one direction along the length of the channel as the link plate pivots in response to a torsional force supplied by the torsional pivot mount,
   wherein when slack in the chain progressively increases due to the wearing of components of the closed loop power transmission system, the ratchet pin traverses through the channel such that the movement of the ratchet pin through the channel urges the base tensioning arm and the adjusting tensioning arm to progressively move toward each other.

2. The ratcheting tensioner of claim 1 wherein the torsional force applied to the torsional pivot mount is provided by a coil spring under compression and located between a perpendicularly upset tab projecting downward from the first edge of the link plate and the outer edge of the base tensioner arm.

3. The ratcheting tensioner of claim 1 wherein the torsional force applied to the torsional pivot mount is provided by a torsion spring operatively engaged with the torsional pivot mount.

4. The ratcheting tensioner of claim 1 wherein the inner side wall of the channel is smooth.

5. The ratcheting tensioner of claim 1 wherein the outer side wall is scalloped.

6. The ratcheting tensioner of claim 1 wherein the adjusting tensioner arm pivots about an engine mount of the adjusting tensioner arm.

7. The ratcheting tensioner of claim 1 wherein the adjusting tensioner arm is non-pivotally secured to the engine.

8. The ratcheting tensioner of claim 1 wherein the inner edge of the base tensioner arm comprises a first protrusion at one end and a second protrusion at its other end, and further comprises a compliant chain guide element having a first hooked shaped end and a second hooked shaped end, with the first hooked shaped end non-permanently hooked around the first protrusion and the second hooked shaped end non-permanently hooked around the second protrusion.

9. The ratcheting tensioner of claim 8 further comprising at least one blade spring between the compliant chain guide element and the inner edge of the base tensioner arm.

10. The ratcheting tensioner or claim 1 wherein the inner edge of the adjusting tensioner arm comprises a first protrusion at one end and a second protrusion at its other end, and further comprises a compliant chain guide element having a first hooked shaped end and a second hooked shaped end, with the first hooked shaped end non-permanently hooked around the first protrusion and the second hooked shaped end non-permanently hooked around the second protrusion.

11. The ratcheting tensioner of claim 10 further comprising at least one blade spring between the compliant chain guide element and the inner edge of the adjusting tensioner arm.

12. The ratcheting tensioner of claim 1 wherein the base tensioner arm further comprises a compliant chain guide element on the inner edge of the base tensioner arm and the adjusting tensioner arm further comprises a compliant chain guide element on the inner edge of the adjusting tensioner arm.

13. A ratcheting tensioner for a closed loop chain driven power transmission system of an internal combustion engine comprising:
   a) a base tensioner arm pivotally mounted to the engine having an inner edge with a chain sliding surface to operatively engage one strand of the chain and an outer edge,
   b) an adjusting tensioner arm mounted to the engine having an inner edge with a chain sliding surface to operatively engage a second strand of the chain and an outer edge being scalloped to provide a non-returning geometry;

c) a link plate having a first edge and a second edge, the link plate being pivotally secured to the base tensioner arm in proximity to its first edge by a torsional pivot mount; and d) a pin located in proximity to the second end of the link plate projecting toward the adjusting tensioner arm to slidably engage the outer edge of the adjusting tensioner arm;

wherein with the progressively increasing slack in chain tension due to the wearing of components of the closed loop power transmission system over time, the pin progressively traverses and ratchets along the outer edge of the adjusting tensioner arm in only one direction thereby causing the link plate to pivot and urge the base tensioning arm and the adjusting tensioning arm to move toward each other.

14. The ratcheting tensioner of claim 13 wherein the torsional force applied to the torsional pivot mount is provided by a coil spring under compression and located between a perpendicularly upset tab projecting downward from the first edge of the link plate and the outer edge of the base tensioner arm.

15. The ratcheting tensioner of claim 13 wherein the torsional force applied to the torsional pivot mount is provided by a torsion spring operatively engaged with the torsional pivot mount.

16. The ratcheting tensioner of claim 13 wherein the inner edge of the base tensioner arm comprises a first protrusion at one end and a second protrusion at its other end, and further comprises a compliant chain guide element having a first hooked shaped end and a second hooked shaped end, with the first hooked shaped end non-permanently hooked around the first protrusion and the second hooked shaped end non-permanently hooked around the second protrusion.

17. The ratcheting tensioner of claim 16 further comprising at least one blade spring between the compliant chain guide element and the inner edge of the base tensioner arm.

18. The ratcheting tensioner of claim 13 wherein the inner edge of the adjusting tensioner arm comprises a first protrusion at one end and a second protrusion at its other end, and further comprises a compliant chain guide element having a first hooked shaped end and a second hooked shaped end, with the first hooked shaped end non-permanently hooked around the first protrusion and the second hooked shaped end non-permanently hooked around the second protrusion.

19. The ratcheting tensioner of claim 18 further comprising at least one blade spring between the compliant chain guide element and the inner edge of the adjusting tensioner arm.

20. The ratcheting tensioner of claim 13 wherein the base tensioner arm further comprises a compliant chain guide element on the inner edge of the base tensioner arm and the adjusting tensioner arm further comprises a compliant chain guide element on the inner edge of the adjusting tensioner arm.

21. The ratcheting tensioner of claim 20 further comprising at least one blade spring between the compliant chain guide element and the inner edge of the base tensioner arm.

22. The ratcheting tensioner of claim 20 further comprising at least one blade spring between the compliant chain guide element and the inner edge of the adjusting tensioner arm.

* * * * *